(12) United States Patent
Uno

(10) Patent No.: US 9,336,183 B2
(45) Date of Patent: May 10, 2016

(54) VEHICLE INFORMATION PROCESSING SYSTEM AND DRIVING ASSISTANCE SYSTEM

(75) Inventor: Satoshi Uno, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 171 days.

(21) Appl. No.: 13/879,524

(22) PCT Filed: Oct. 15, 2010

(86) PCT No.: PCT/JP2010/068159
§ 371 (c)(1),
(2), (4) Date: Apr. 15, 2013

(87) PCT Pub. No.: WO2012/049767
PCT Pub. Date: Apr. 19, 2012

(65) Prior Publication Data
US 2013/0204460 A1 Aug. 8, 2013

(51) Int. Cl.
*G06F 17/00* (2006.01)
*B60W 30/18* (2012.01)
*G01C 21/34* (2006.01)
*G08G 1/0967* (2006.01)

(52) U.S. Cl.
CPC ......... *G06F 17/00* (2013.01); *B60W 30/18154* (2013.01); *G01C 21/3484* (2013.01); *G08G 1/09675* (2013.01); *G08G 1/096716* (2013.01); *G08G 1/096783* (2013.01)

(58) Field of Classification Search
CPC .......... B60W 2550/402; B60W 20/00; B60W 2550/22; B60W 2550/143; B60W 30/143; B60W 2050/0089; B60W 30/18109; B60W 30/18154; B60W 50/0097; B60W 2530/14; B60W 2550/14; B60W 30/18072; B60W 30/181
See application file for complete search history.

(56) References Cited

U.S. PATENT DOCUMENTS

| | | |
|---|---|---|
| 3,872,283 A | 3/1975 | Smith et al. |
| 5,661,650 A | 8/1997 | Sekine et al. |
| 6,115,668 A | 9/2000 | Kaneko et al. |

(Continued)

FOREIGN PATENT DOCUMENTS

| | | |
|---|---|---|
| DE | 10 2008 019 174 A1 | 10/2009 |
| JP | 2005-7932 A | 1/2005 |

(Continued)

OTHER PUBLICATIONS

International Search Report Issued Jan. 25, 2011 in PCT/JP2010/068159.

(Continued)

*Primary Examiner* — Nicholas Kiswanto
(74) *Attorney, Agent, or Firm* — Oblon, McClelland, Maier & Neustadt, L.L.P.

(57) ABSTRACT

A vehicle information processing system includes a database that mutually associates and stores driving operation information of a driver and position information of a vehicle for each candidate of an assistance area; and a specification unit that determines a vehicle stop based on the information stored in the database, and specifies an assistance area based on stop frequency in the same area. By this configuration, the assistance area can be specified by learning a driving action of the driver based on the database which stores information for each vehicle, and an assistance that is appropriate for the driver can be performed for each vehicle.

12 Claims, 4 Drawing Sheets

(56) References Cited

U.S. PATENT DOCUMENTS

| | | | |
|---|---|---|---|
| 6,161,072 A | 12/2000 | Clapper | |
| 6,252,544 B1 | 6/2001 | Hoffberg | |
| 6,268,825 B1* | 7/2001 | Okada | B60T 8/172 342/357.52 |
| 6,549,145 B2 | 4/2003 | Hsu et al. | |
| 6,631,322 B1 | 10/2003 | Arthur et al. | |
| 6,655,754 B2* | 12/2003 | Crombez | B60L 7/26 188/156 |
| 6,847,892 B2 | 1/2005 | Zhou et al. | |
| 6,993,421 B2 | 1/2006 | Pillar et al. | |
| 7,522,990 B2* | 4/2009 | Daum | B60L 15/36 701/123 |
| 7,841,673 B2* | 11/2010 | Szczerba | B60T 1/10 303/15 |
| 7,849,944 B2* | 12/2010 | DeVault | B60K 6/365 180/65.265 |
| 8,019,501 B2 | 9/2011 | Breed | |
| 8,073,605 B2* | 12/2011 | Naik | B60T 7/18 180/65.29 |
| 8,185,296 B2* | 5/2012 | Yokoyama | B60W 30/16 701/117 |
| 2006/0290202 A1* | 12/2006 | Shibata | B60T 7/22 303/165 |
| 2007/0027583 A1* | 2/2007 | Tamir | G06Q 30/0283 701/1 |
| 2007/0265759 A1 | 11/2007 | Salinas et al. | |
| 2008/0243312 A1 | 10/2008 | Nakamura et al. | |
| 2009/0319176 A1 | 12/2009 | Kudoh et al. | |
| 2010/0004839 A1 | 1/2010 | Yokoyama et al. | |
| 2010/0063722 A1 | 3/2010 | Yoshikawa | |
| 2010/0112529 A1* | 5/2010 | Miura | B60T 8/3275 434/65 |
| 2013/0038127 A1* | 2/2013 | King | B60L 11/1857 307/64 |
| 2013/0204460 A1 | 8/2013 | Uno | |

FOREIGN PATENT DOCUMENTS

| | | |
|---|---|---|
| JP | 2005-174314 A | 6/2005 |
| JP | 2005-297817 A | 10/2005 |
| JP | 2006-347531 | 12/2006 |
| JP | 2007-008203 A | 1/2007 |
| JP | 2007-8327 A | 1/2007 |
| JP | 2007-196851 A | 8/2007 |
| JP | 2008-074337 A | 4/2008 |
| JP | 2008-275575 A | 11/2008 |
| JP | 2009-31046 A | 2/2009 |
| JP | 2009-31837 A | 2/2009 |
| JP | 2009-53732 A | 3/2009 |
| JP | 2009-179168 A | 8/2009 |
| JP | 2009-244167 A | 10/2009 |
| WO | WO 2009/059766 A1 | 5/2009 |
| WO | WO 2010/081836 A1 | 7/2010 |

OTHER PUBLICATIONS

Office Action issued Mar. 25, 2015 in U.S. Appl. No. 13/498,412.
U.S. Appl. No. 13/976,752, filed Jan. 12, 2011, inventor Satoshi Uno.

\* cited by examiner

VEHICLE INFORMATION PROCESSING SYSTEM AND DRIVING ASSISTANCE SYSTEM

TECHNICAL FIELD

The present invention relates to a vehicle information processing system and a driving assistance system which assist a vehicle driver.

BACKGROUND ART

Various techniques for assisting a vehicle driver have been developed. For example, in a driving assistance apparatus described in Patent Literature 1, a stop position of a vehicle is pre-specified based on map information or traffic information, an inertia running beginning position for inertia running up to the stop position is specified based on the specified stop position and a reachable distance using the inertia running, the inertia running beginning position (accelerator is off), a brake beginning position (brake is on), or the like is informed to the driver, and thereby the driver is allowed to perform an energy-saving driving.

CITATION LIST

Patent Literature

[Patent Literature 1] Japanese Unexamined Patent Application Publication No. 2009-244167
[Patent Literature 2] Japanese Unexamined Patent Application Publication No. 2009-53732

SUMMARY OF INVENTION

Technical Problem

In case of a driving assistance apparatus described in Patent Literature 1, a stop position is uniformly specified from map information or traffic information, and a uniform assistance is performed based on the uniform stop position. However, the stop position varies for each vehicle (furthermore, for each driver of the vehicle), and even with regard to operation during deceleration stop, each driver has different timing when a brake is on after an accelerator is off. Thus, if the uniform assistance is performed regardless of the vehicle (driver), the assistance irritates the driver.

Thus, an object of the present invention is to provide a vehicle information processing system and a driving assistance system which can perform an appropriate assistance to a driver for each vehicle.

Solution to Problem

A vehicle information processing system according to the present invention includes a database that mutually associates and stores driving operation information of a driver and position information of a vehicle, and a specification unit that determines a vehicle stop based on information stored in the database, and specifies an assistance area based on stop frequency in the same area.

In the vehicle information processing system, when the driver drives the vehicle, the driving operation information (for example, accelerator operation information and brake operation information) of the driver and the position information of the vehicle are mutually associated and stored in the database, and the information is stored for each vehicle in the database. Particularly, if each driver can be specified, it is preferable to store the information for each driver. Then, in the vehicle information processing system, vehicle stop by the driver's driving operation in each area is determined based on each vehicle information which is stored in the database and the assistance area is specified based on the stop frequency in the same area, by the specification unit. Since the vehicle driver always performs the deceleration stop and the start acceleration in an area with high stop frequency for each vehicle, the assistance can be performed with respect to the driver in a deceleration stop place and in a start acceleration place which are usual for the vehicle. In addition, for example, since a deceleration beginning position (when an accelerator is off), a brake beginning position (when a brake is on), and a stop position (when the brake is off), which are usual for each driver, are determined using the driving operation information in the area and the position information of the vehicle, in case of the deceleration stop, the assistance can be performed with respect to the driver using a usual driving operation sense of the vehicle driver. In this manner, in the vehicle information processing system, the assistance area is specified by learning the driver's driving action for each vehicle based on the database which stores information for each vehicle, whereby the assistance which is appropriate for the driver is performed for each vehicle. Since the assistance which is appropriate for the driver is performed for each vehicle, the driver can receive the assistance without feeling discomfort and irritation with respect to the assistance.

In the vehicle information processing system according to the present invention, it is preferable that the driving operation information and the position information are mutually associated and stored in the database for each assistance area candidate.

In the vehicle information processing system, the driving operation information of the driver and the position information of the vehicle are mutually associated and stored in the database each time the vehicle passes through the assistance area candidate when the driver drives the vehicle, and each candidate information of the assistance area for each vehicle is stored in the database. In this manner, since each candidate information of the assistance area is stored in the database, the vehicle information processing system can determine the vehicle stop with regard to the candidate of each assistance area using each candidate information of the assistance area which is stored in the database, and can obtain the stop frequency for each assistance area candidate. Then, the assistance area candidate with the high stop frequency can be specified as the assistance area.

In the vehicle information processing system according to the present invention, it is preferable that the driving operation information of the driver and the position information of the vehicle be mutually associated and stored, and an area with frequent deceleration operations is set as the assistance area candidate based on the stored information.

In the vehicle information processing system, in order to set the assistance area candidate, the driving operation information of the driver and the position information of the vehicle are mutually associated and stored when the driver drives the vehicle. Then, the vehicle information processing system extracts the deceleration operation from the stored information, and sets the area with frequent deceleration operations as the assistance area candidate. In this manner, in the vehicle information processing system, since the assistance area candidate is set by learning the driving action of the driver for each vehicle based on the driving operation information of the driver for each vehicle, the assistance area candidate can be set according to the drive for each vehicle.

In the vehicle information processing system according to the present invention, it is preferable that the assistance area candidate is set based on the position information predicted in advance of where the vehicle is likely to stop.

In the vehicle information processing system, the assistance area candidate is set based on the position information (for example, the position information such as a temporary stop, a railroad crossing, and a traffic signal (at red light) which are regulated to stop by law) predicted in advance of where the vehicle is likely to stop. In this manner, in the vehicle information processing system, since the assistance area candidate is set based on the position information predicted in advance of where the vehicle is likely to stop, it is not necessary to perform data storage, learning, or the like for each vehicle, and it is possible to easily set the assistance area candidate.

In the vehicle information processing system according to the present invention, it is preferable that the specification unit classify an operation into an acceleration operation and a deceleration operation from an operation transition order using the driving operation information stored in the database.

In the vehicle information processing system, the specification unit classifies the acceleration operation and the deceleration operation from an operation transition order using the driving operation information in the database. The classified acceleration operation and deceleration operation can be used in determining the vehicle stop, and the driving action of the driver can be extracted for each vehicle so as to be used in the driver assistance for each vehicle.

In the vehicle information processing system according to the present invention, it is preferable that the driving operation information when the vehicle stops or the driving operation information when the vehicle starts be extracted based on the classified acceleration operation and deceleration operation, and the assistance be performed with respect to the driver using the extracted driving operation information.

In the vehicle information processing system, deceleration stop operation information is extracted based on the classified acceleration operation and deceleration operation when the vehicle stops, the assistance is performed with respect to the driver during the deceleration stop using the deceleration stop operation information, whereby the assistance which is appropriate for the driving action can be performed when the driver performs the deceleration stop for each vehicle. Since the deceleration beginning position (when the accelerator is off), the brake beginning position (when the brake is on), and the stop position (when the brake is off) which are usual for each vehicle can be extracted based on the deceleration stop operation information, and thereby the assistance can be performed with respect to the driver using a usual deceleration stop operation sense of the driver for each vehicle. In addition, in the vehicle information processing system, start acceleration operation information when the vehicle starts is extracted based on the classified acceleration and deceleration operation, and the assistance is performed with respect to the driver during the start acceleration using the start acceleration operation information, and thereby the assistance which is appropriate for the driving action can be performed during the driver's start and acceleration for each vehicle. Since the start beginning position (when the brake is off), the accelerator beginning position (when the accelerator is on) which are usual for each vehicle can be extracted based on the start acceleration operation information, and the assistance can be performed with respect to the driver using a usual start acceleration operation sense of the driver for each vehicle.

In the vehicle information processing system according to the present invention, behavior information of the vehicle may be associated and stored in addition to the driving operation information and the position information in the database.

The vehicle information processing system mutually associates and stores the behavior information (for example, vehicle speed information, and acceleration and deceleration information) of the vehicle in addition to the driving operation information of the driver and the position information of the vehicle in the database. In this manner, in the vehicle information processing system, since the behavior information of the vehicle is also associated and stored in the database, the vehicle stop can be determined more accurately, and the driving action can be learned for each vehicle in more detail.

In the vehicle information processing system according to the present invention, an assistance with respect to the vehicle driver is operation assistance during the deceleration stop or/and an operation assistance during the start acceleration. In addition, in the vehicle information processing system according to the present invention, the vehicle stop which is counted in the stop frequency is the stop during the deceleration stop and/or during the start acceleration.

In the vehicle information processing system according to the present invention, the database may have a configuration which is included in a center that performs the assistance with respect to the vehicle. In addition, in the vehicle information processing system according to the present invention, the database may have a configuration which is included in the vehicle.

A driving assistance system according to the present invention includes a database that mutually associates and stores driving operation information of a driver and position information of a vehicle; a specification unit that determines a vehicle stop based on the information stored in the database, and specifies an assistance area based on stop frequency in the same area; and an assistance unit that performs an assistance with respect to the driver based on the assistance area specified by the specification unit.

The driving assistance system includes the same database and specification unit as the vehicle information processing system according to the above present invention, and specifies the assistance area using the database. Then, in the driving assistance system, the assistance is performed by an assistance unit with respect to the vehicle driver based on the specified assistance area. In this manner, in the driving assistance system, the assistance area is specified by learning the driving action of the driver for each vehicle based on the database which stores each vehicle information, the assistance is performed with respect to the driver based on the assistance area, thereby the assistance which is appropriate for the driver can be performed for each vehicle.

Advantageous Effects of Invention

According to the present invention, an assistance area is specified by learning a driving action of a driver for each vehicle based on a database which stores each vehicle information, and thereby an assistance which is appropriate for the driver can be performed for each vehicle.

DESCRIPTION OF EMBODIMENTS

Figure 1:
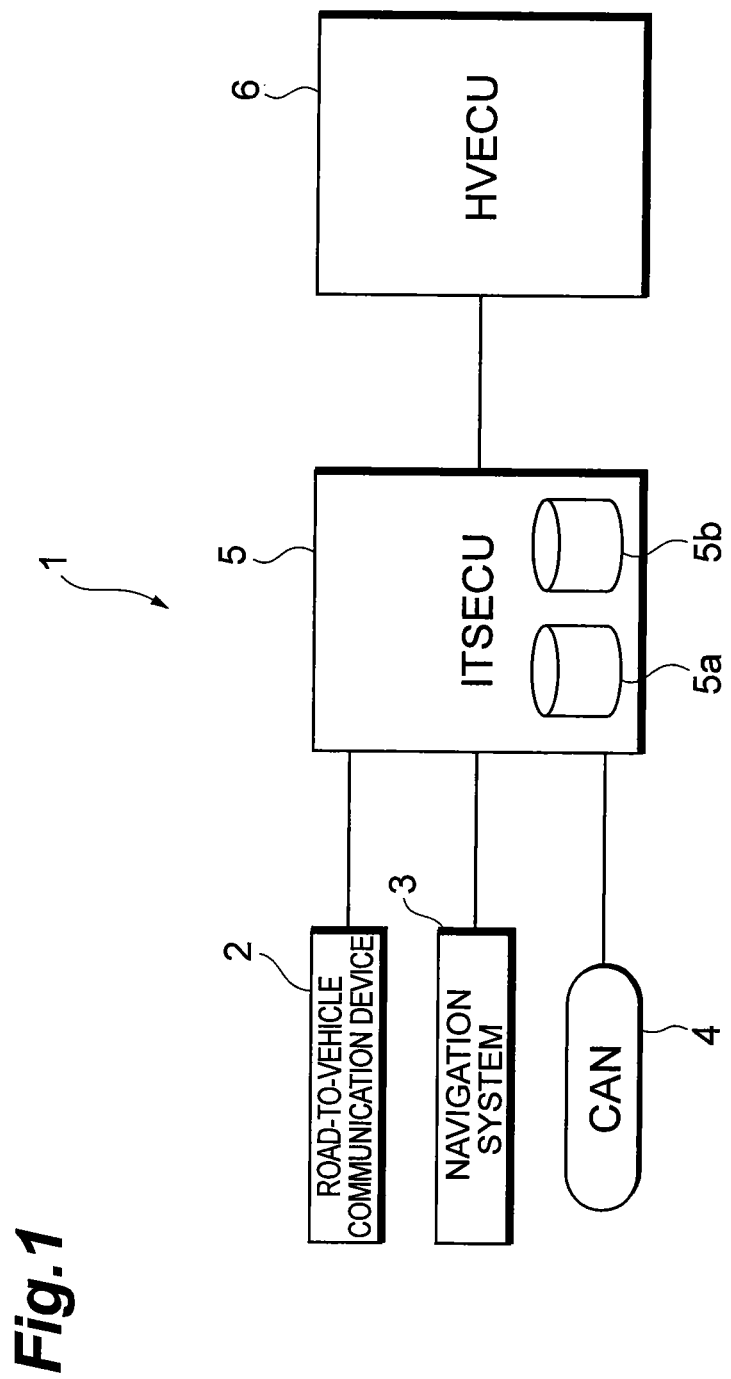
FIG. 1 is a configuration diagram of a vehicle information processing system according to the present embodiment.

Hereinafter, embodiments of a vehicle information processing system and a driving assistance system according to the present invention will be described with reference to the drawings. In addition, the same reference numerals are denoted with regard to the same or corresponding elements in each drawing, and repeated descriptions will be omitted.

In the present embodiment, the present invention is applied to a vehicle information processing system (driving assistance system) which is mounted on a hybrid vehicle having an eco-assistance function. In the vehicle information processing system according to the present embodiment, a function is configured to realize the eco-assistance (assist a fuel-efficient driving with respect to a vehicle driver) which is appropriate for the driver for each vehicle during a deceleration stop as one function of intelligent transport systems (ITS). In the present embodiment, the function will be described in detail. In addition, as a prerequisite, the deceleration is an action of decreasing speed accompanied by a foot brake operation. It is determined that there is a chance of improving a fuel efficiency because of the foot brake operation.

As an eco-assistance technology, a technology coordinated with an infrastructure is considered, and a target area on which the eco-assistance is performed is an intersection or the like in which infrastructure facilities (for example, beacon) are installed. However, it is impossible to install the infrastructure facilities in the whole intersections in which there is a possibility that the vehicle may stop, and thus it is impossible to assist the whole places where the vehicle stops, in the eco-technology coordinated with the infrastructure. Therefore, in the vehicle information processing system according to the present embodiment, a candidate area of the assistance area is set by learning, the assistance area in which the vehicle always performs deceleration stop (area with a high possibility of repeating the deceleration stop action in a usual travel route of the vehicle) is specified out of the candidate area through the learning, a unique vehicle deceleration action in the assistance area is extracted, and the eco-assistance is performed by using the assistance area and the deceleration action (deceleration prediction information).

Figure 2:
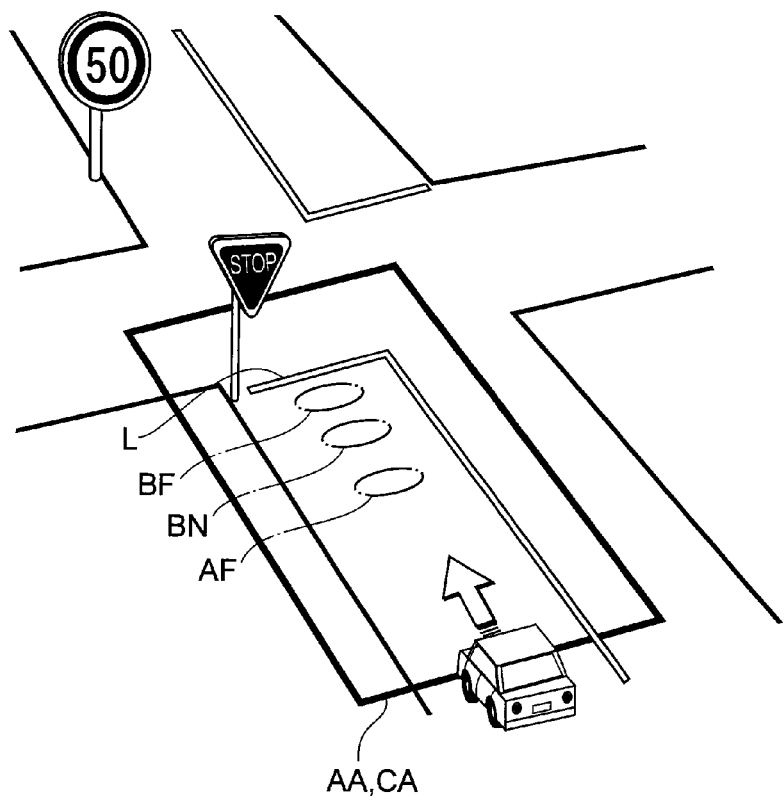
FIG. 2 is an example of a candidate area (assistance area)
Figure 3:
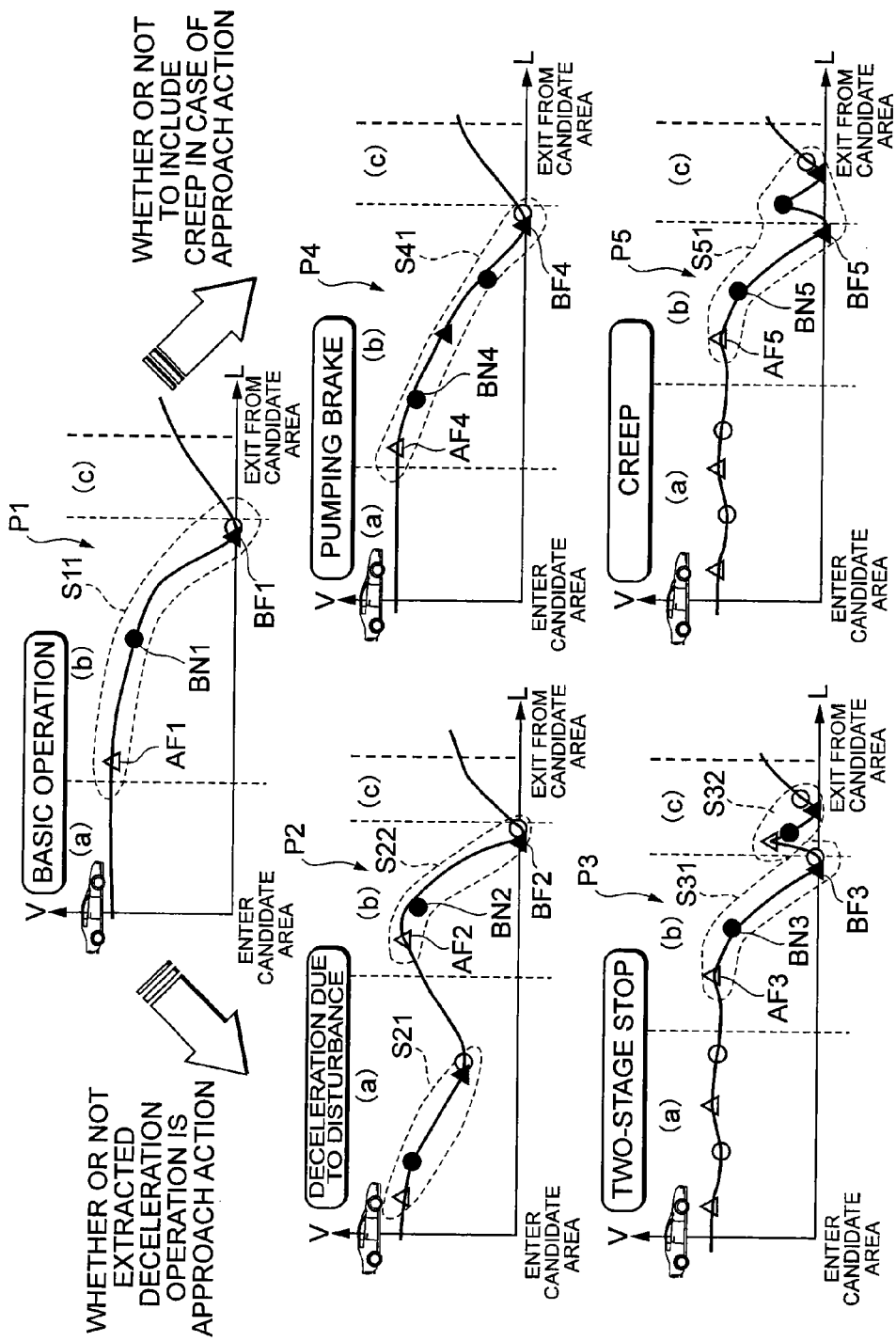
FIG. 3 is an explanatory diagram of a deceleration action learning according to the present embodiment.

The vehicle information processing system 1 according to the present embodiment will be described with reference to FIGS. 1 to 3. FIG. 1 is a configuration diagram of the vehicle information processing system according to the present embodiment. FIG. 2 is an example of the candidate area (the assistance area). FIG. 3 is an explanatory diagram of the deceleration action learning according to the present embodiment.

The vehicle information processing system 1 performs candidate area learning for setting the assistance candidate area, deceleration action learning which extracts the deceleration prediction information by learning the deceleration action for each candidate area, and deceleration prediction (eco-assistance) which outputs the deceleration prediction information (read-ahead information) for each assistance area. Accordingly, the vehicle information processing system 1 includes a road-to-vehicle communication device 2, a navigation system 3, a controller area network (CAN) 4, an electronic control unit (ITSECU) 5, and a hybrid vehicle (HV) ECU 6. In addition, in the candidate area learning or the deceleration action learning, each vehicle information is stored in a database, but a unit which recognizes the driver may be provided to store the information in the database for each recognized driver. In addition, if the driver which drives the vehicle is specified, the information of the driver may be stored in the database, and a method for specifying the driver from a vehicle behavior or a travel route may be used.

The road-to-vehicle communication device 2 is a device for performing a road-to-vehicle communication with the infrastructure beacon or the like. When the vehicle enters a communication area of the infrastructure, the road-to-vehicle communication device 2 receives information from the infrastructure, and transmits the received information to the ITSECU 5. For example, the information required for the ITSECU 5 out of the information from the infrastructure has road linear information to the intersection of a service target, the intersection information (for example, intersection shape information or intersection position information, and stop line information), and signal cycle information.

The navigation system 3 is a system which performs a current position detection of the vehicle, a route guidance to a destination, and the like. Particularly, when the current position of the vehicle is detected based on the received signal using a global positioning system (GPS) receiver every constant time, the navigation system 3 transmits the current position information to the ITSECU 5 or the HVECU 6. In addition, the navigation system 3 transmits map information required for the ITSECU 5 out of the data stored in a map database, to the ITSECU 5. For example, the information required for the ITSECU 5 is the position information on the place where the vehicle is regulated to stop by law, and is the position information such as the temporary stop, the railroad crossing, and the traffic signal. In addition, in a case where the vehicle does not include the navigation system, the vehicle may have a configuration which includes the GPS receiver for obtaining the current position of the vehicle.

The CAN 4 is a LAN within the vehicle, and is used for transmission and reception of information within the vehicle. For example, the information required for the ITSECU 5 out of the information flowing in the CAN 4 includes the accelerator operation information, brake operation information, vehicle speed information, and acceleration and deceleration information. In addition, ITSECU 5 includes a communication interface of the CAN 4.

The ITSECU 5 is an electronic control unit configured to have a central processing unit (CPU), a read only memory (ROM), a random access memory (RAM) or the like, and realizes various functions of an intelligent transportation system. Hereinafter, it will be described with regard to a function (particularly, the candidate area learning, and the deceleration action learning) for realizing the eco-assistance which is appropriate for the driver for each vehicle during the deceleration stop among the functions of the ITSECU 5.

The candidate area learning will be described. In the candidate area learning, a frequent deceleration operation section in the travel route of the vehicle (moreover, the vehicle driver) is extracted as the candidate area. The learning method has 2 types. One type is to extract the candidate area based on the position (for example, the temporary stop, the traffic signal (at red light), the railroad crossing, and the like which are regulated to stop by law) in which the vehicle is predicted to perform deceleration-stop in the travel route of the vehicle. The other type is to mutually associate and store the driver's pedal operation information and the vehicle position information when the driver drives the vehicle, and is to extract the section in which the vehicle driver actually and frequently performs the deceleration operation as the candidate area, based on the stored information.

A specific process in the first type will be described. During the vehicle travel, the ITSECU 5 receives the map information (particularly, the information on the position where the vehicle is predicted to stop, such as the temporary stop, the railroad crossing, and the traffic signal) related to the travelling road from the navigation system 3 (the map database) during the travel. Then, whenever receiving the current position information from the navigation system 3, the ITSECU 5 determines whether or not to the vehicle has passed through the position (the deceleration operation is predicted to be frequent at a section ahead of such a position) where the vehicle is predicted to be stopped. When passing through the position where the vehicle is predicted to stop, the ITSECU 5 sets the candidate area based on the position information. In addition, the position where the vehicle is predicted to stop may include a position which is registered in the navigation system 3 as a destination or a location such as home and a company.

A specific process in the second type will be described. During the vehicle travel, every constant time or every constant travelling distance, the ITSECU 5 mutually associates and stores the accelerator operation information and the brake operation information which are received from the CAN 4, and the current position information from the navigation system 3 in the database 5a.

When the data is stored in the database 5a, the ITSECU 5 extracts the deceleration operation based on the accelerator operation information and the brake operation information which are stored in the database 5a. The deceleration operation is an operation which is performed in order of the accelerator-off, brake-on/off (repeatable), and accelerator-on. Then, ITSECU 5 counts up the number of passages in passing through the same route, and in a case when the deceleration operation is extracted in the same section, the ITSECU 5 counts up the number of deceleration operations, and calculates a deceleration operation rate by dividing the number of deceleration operations by the number of passages. Furthermore, the ITSECU 5 sets a section in which the number of passages is a predetermined number or more (for example, 5 times, 10 times or more), and the deceleration operation rate is a threshold value or more (for example, 80%, 90% or more), as the candidate area. A method for determining the section of the frequent deceleration operations may be alternatively used.

When setting the candidate area, the ITSECU 5 sets an area which includes all traffic lanes in a direction of the vehicle travel as a width direction and includes a predetermined distance as a length direction, as the candidate area. The predetermined distance is set as a distance in which the driver's deceleration operation to stop is sufficiently included. For example, as illustrated in FIG. 2, in case of the intersection with a temporary stop line L, the section from a center position within the intersection in front of the temporary stop line L to a predetermined position (position 100 meters ahead) in behind of the temporary stop line L is set as the candidate area CA. The length of the section is a distance in which the deceleration action is sufficiently extracted when stopping. In addition, a range which is appropriate for each vehicle (moreover, for each driver) may be set by learning and using a travel distance for each vehicle during the deceleration operation of the driver.

The deceleration action learning will be described. In the deceleration action learning, various information is stored whenever passing through the candidate area, a valid deceleration operation within the candidate area is extracted based on the stored information, the candidate area with high stop frequency in which the valid deceleration operation is extracted is specified as the assistance area, and the deceleration prediction information in the assistance area is calculated. As illustrated in FIG. 2, the deceleration prediction information is a deceleration beginning position AF (a position where the accelerator is in the off-operation), a brake beginning position BN (a position where the brake is in the on-operation), and a stop position BF (a position where the brake is in the off-operation) for each assistance area AA.

Before a process regarding the deceleration action learning is specifically described, a deceleration pattern which is used in the deceleration action learning will be described. The deceleration pattern is a pattern which indicates a pedal operation transition that can correspond to various driving actions, by focusing on the pedal operation which is essentially required to perform the deceleration action, and is a pattern of the deceleration action accompanied by the brake operation triggered by an accelerator-off operation. Since such various deceleration patterns are used, in a case where there is any deceleration approach to a usual deceleration object of the vehicle (moreover, the vehicle driver), the driver's habit or effect of disturbance is distinguished for each vehicle, and whereby the learning with a high accuracy is performed.

FIG. 3 illustrates the example. The deceleration pattern indicated by a reference numeral P1 is a deceleration pattern of a basic operation. The deceleration pattern indicated by a reference numeral P2 is a deceleration pattern with the deceleration due to the disturbance (for example, avoiding a stopped vehicle) before the deceleration with respect to the deceleration object. The deceleration pattern indicated by a reference numeral P3 is a deceleration pattern of two-stage stop. The deceleration pattern indicated by a reference numeral P4 is a deceleration pattern in a pumping brake. The deceleration pattern indicated by a reference numeral P5 is a deceleration pattern when there is a creep operation. Incidentally, the creep operation is an operation which gradually changes the stop position by causing the driver to repeatedly perform the on/off operation of the brake. In FIG. 3, a horizontal axis is a vehicle position (the travel distance) L and a vertical axis is a vehicle speed V. In FIG. 3, a white triangle indicates the accelerator-off operation, a white circle indicates an accelerator-on operation, a black triangle indicates a brake-off operation, and a black circle indicates the brake-on operation. In FIG. 3, sections (b) are sections of an approach toward the deceleration object, sections (a) are sections before the approach, and sections (c) are sections after the approach. The deceleration action in the approach section (b) is the deceleration stop action toward the deceleration object of the vehicle (the driver).

Then, a specific process will be described. In a case where the candidate area is set in the candidate area learning, the ITSECU 5 determines whether or not the vehicle has entered the candidate area during the vehicle travel, whenever receiving the current position information from the navigation system 3. In a case where it is determined that the vehicle has entered the candidate area, the ITSECU stores the accelerator operation information, brake operation information, and vehicle state information (for example, the vehicle speed information, and the acceleration and deceleration information) which are supplied from the CAN 4 by associating them with the current position information from the navigation system 3, in the database 5b, every constant time or every constant travelling distance. Then, the ITSECU 5 determines whether or not the vehicle has exited from the candidate area during the vehicle travel, whenever receiving the current position information from the navigation system 3. In a case where it is determined that the vehicle has exited from the candidate area, the ITSECU 5 finishes storing the information in the database 5b, and counts up the number of passages with respect to the passed candidate area once. In addition, as the data to be stored in the database 5b, only the information when the accelerator pedal/brake pedal on/off state is detected may be stored.

When the vehicle exits from the candidate area, the ITSECU 5 sorts the deceleration operation and the acceleration operation, based on the data stored at this time with regard to the candidate area. As described above, the deceleration operation is an operation performed in order of the accelerator-off, the brake-on/off (repeatable), and the accelerator-on. The accelerator operation is an operation performed in order of the accelerator-off, and the accelerator-on (repeatable).

When the deceleration operation and the acceleration operation are sorted, based on the deceleration operation and the acceleration operation which are sorted within the candidate area, the ITSECU 5 discriminates the related deceleration pedal from available deceleration patterns, determines whether the deceleration operation within the candidate area is an approach deceleration action toward the deceleration object or the deceleration action before or after the approach, and extracts only the approach deceleration action out of the deceleration operations within the candidate area. The deceleration action before or after the approach is the deceleration due to the disturbance, the two-stage stop or the like, and is not the deceleration action with respect to the deceleration object. Thus, the deceleration action before or after the approach is not used as a sample for creating the deceleration prediction information. In this manner, the ITSECU 5 determines whether or not the vehicle performs the deceleration stop, using the approach deceleration action (the deceleration operation) within the candidate area. If there is no such action, the number of stop is not counted, and thereby stops further subsequent sorting.

In addition, determining whether it is the approach deceleration action or the deceleration action before or after the approach focuses on the vehicle speed (the vehicle speed when the deceleration is begun) when the accelerator is off in the deceleration operation, and the vehicle speed (the vehicle speed when the deceleration is finished) when the brake is off. As can be seen from the example in FIG. 3, the deceleration operation in the approach is the deceleration from a high speed to a low speed (particularly, stop), the deceleration operation before the approach is the deceleration from one high speed to another high speed, and the deceleration operation after the approach is the deceleration from one low speed to another low speed. Therefore, the deceleration operation in case of a low speed (stop) from a high speed is extracted as the approach deceleration action toward the deceleration object.

In case of the example illustrated in FIG. 3, in the deceleration pattern P1 of the basic operation, the deceleration operation S11 is the approach deceleration action, and the deceleration operation S11 is extracted. In the deceleration pattern P2 with the disturbance deceleration, the deceleration operation S21 is the deceleration action before the approach, the deceleration operation S22 is the approach deceleration action, and the deceleration operation S22 is extracted. In the deceleration pattern P3 of the two-stage stop, the deceleration operation S31 is the approach deceleration action, the deceleration operation S32 is the deceleration action after the approach, and the deceleration operation S31 is extracted. In the deceleration pattern P4 of the pumping brake, the deceleration operation S41 is the approach deceleration action, and the deceleration operation S41 is extracted. In the deceleration pattern P5 with the creep, the deceleration operation S51 is the approach deceleration action. However, in this case, the creep operation after the stop is extracted together, and thus it is necessary to properly remove the creep portion.

When the approach deceleration action is extracted, the ITSECU 5 determines whether or not there is the creep operation in the approach deceleration action. In the determination, the vehicle speed is focused on when the brake is off in the operation within the approach, and in a case where there are continuously multiple brake-off operations when the vehicle speed is low, it is determined that there is the creep. In addition, in a case where there is the creep operation, the vehicle stops, and the stop position is continuously changed by the driver's brake-on/off operation after the brake is off, and thus presence or absence of the creep operation is determined in order to accurately discriminate the vehicle stop position.

If the presence or absence of the creep operation is determined, based on the deceleration operation in the approach deceleration action, the ITSECU 5 specifies the deceleration beginning position from the position information when the accelerator is in the off-operation, specifies the brake beginning position from the position information when the brake is in the on-operation, and specifies the stop position from the position information when the brake is in off-operation. With regard to the brake-on operation, in a case where the brake-on/off is repeated, the brake-on operation after the accelerator is in the off-operation is extracted. With regard to the brake-off operation, in a case where the brake-on/off is repeated, the final brake-off operation is extracted. However, in a case where there is the creep operation, the first brake-off operation beginning the creep operation is extracted.

As is the example illustrated in FIG. 3, in case of the approach deceleration operation S11, the position at the time of the accelerator-off operation AF1 is the deceleration beginning position, the position at the time of the brake-on operation BN1 is the brake beginning position, and the position at the time of the brake-off operation BF1 is the stop position. In case of the approach deceleration operation S22, the position at the time of an accelerator-off operation AF2 is the deceleration beginning position, the position at the time of the brake-on operation BN2 is the brake beginning position, and the position at the time of the brake-off operation BF2 is the stop position. In case of the approach deceleration operation S31, the position at the time of the accelerator-off operation AF3 is the deceleration beginning position, the position at the time of the brake-on operation BN3 is the brake beginning position, and the position at the time of the brake-off operation BF3 is the stop position. In case of the approach deceleration operation S41, the position at the time of the accelerator-off operation AF4 is the deceleration beginning position, the position at the time of the brake-on operation BN4 is the brake beginning position, and the position at the time of the brake-off operation BF4 is the stop position. In case of the approach deceleration operation S51, the position at the time of the accelerator-off operation AF5 is the deceleration beginning position, the position at the time of the brake-on operation BN5 is the brake beginning position, and the position at the time of the brake-off operation BF5 is the stop position.

Then, in a case where it is determined that there has been the deceleration stop action within the candidate area, the ITSECU 5 counts up the number of stops with respect to the candidate area once. Furthermore, the ITSECU 5 divides the number of stops with regard to the candidate area by the number of passages, and calculates a stop rate. Then, in a case where the number of passages with regard to the candidate area is a predetermined number or more (for example, 5 times, 10 times or more) and the stop rate (corresponding to the stop frequency) is a threshold value or more (for example, 80%, 90% or more), the ITSECU 5 specifies the candidate area as the assistance area.

In a case where the candidate area is specified as the assistance area, the ITSECU 5 updates assistance area registration information. The assistance area registration information is the deceleration prediction information, and is the deceleration beginning position information, brake beginning position information, and stop position information, for each assistance area. The deceleration beginning position is a usual deceleration beginning position when the vehicle (the driver) stops with respect to the deceleration object, the brake beginning position is a usual brake beginning position when the vehicle driver begins the brake operation, and the stop position is a usual stop position of the vehicle (the driver). In addition, whenever the vehicle travels on the same travel route, the deceleration beginning position information, the brake beginning position information, and the stop position information, with regard to the same assistance area, are obtained, and thus, an average position with regard to each position is registered as each position information, for example.

Then, when the vehicle passes through the assistance area next time, the ITSECU 5 transmits the assistance area registration information to the HVECU 6 in order to perform the eco-assistance.

The HVECU 6 is the electronic control unit which is configured to have the CPU, the ROM, the RAM or the like, and controls an engine and a motor (an inverter) which are power sources of the hybrid vehicle, and the brake or the like which is a braking source. Hereinafter, only the eco-assistance function using the assistance area registration information from the ITSECU 5 among the functions of the HVECU 6 will be described. Incidentally, when the hybrid vehicle performs the deceleration stop, the eco-assistance includes fuel consumption suppression using early accelerator-off, increment in a power amount recovered by a changeable regeneration brake amount, suppression of a fuel consumption amount and a power consumption amount using the engine stop, and the like.

During the vehicle travel, whenever receiving the current position information from the navigation system 3, the HVECU 6 determines whether or not the vehicle has entered the assistance area. In a case where it is determined that the vehicle has entered the assistance area, based on the deceleration beginning position of the deceleration prediction information, the HVECU 6 provides the driver with the information for urging the accelerator-off operation earlier than usual at the position ahead of the deceleration beginning position. When the information is provided, for example, a message such as "if the accelerator-off is performed earlier than usual, the fuel consumption can be suppressed" is displayed on a screen, or a sound is output. When the driver performs the accelerator-off operation within the assistance area, based on the stop position of the deceleration prediction information, the HVECU 6 controls the motor (inverter) or the brake so that the regeneration brake amount may be increased (for example, so that a deceleration degree may be increased). In addition, the eco-assistance using the deceleration prediction information illustrated here is one example, and another method using the deceleration prediction information may be used in order to perform the eco-assistance.

In addition, in case of an automatic driving vehicle or a vehicle with an ACC function, an acceleration and deceleration control is performed using a control from a vehicle side, and thus the vehicle side controls the engine, the motor, and the brake based on the usual deceleration stop action of the vehicle (the driver) at the usual deceleration stop position of the vehicle (the driver). Thereby, the early accelerator-off, increasing the regeneration brake amount and stopping the engine may be performed, based on the deceleration prediction information.

Figure 4:
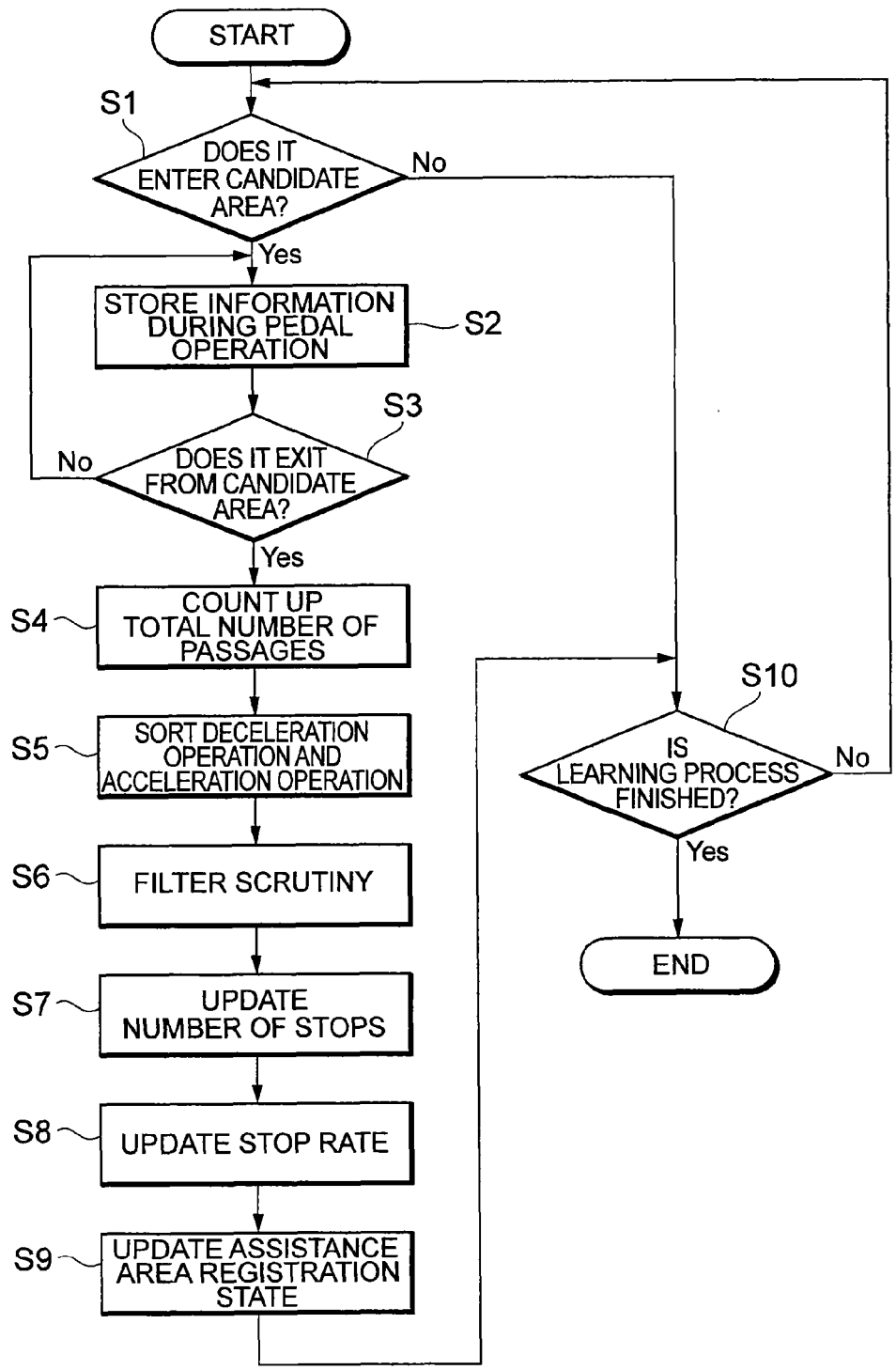
FIG. 4 is a flow chart illustrating a flow of a deceleration action learning according to the present embodiment.

With reference to FIG. 1, the operation of the vehicle information processing system 1 will be described. Particularly, the deceleration action learning in the ITSECU 5 will be described according to the flow chart in FIG. 4. FIG. 4 is a flow chart illustrating a flow of the deceleration action learning according to the present embodiment.

Whenever the vehicle enters the communication area of the infrastructure, the road-to-vehicle communication device 2 receives the road linear information from the infrastructure to the intersection of the service target, the intersection information, the signal cycle information, and the like, and transmits necessary information among them to the ITSECU 5. In addition, whenever detecting the current position based on the GPS signal and the like, the navigation system 3 transmits the current position information and the map information around the current position to the ITSECU 5. In addition, the ITSECU 5 obtains the pedal operation information, the vehicle speed information, and the like from the CAN 4.

Whenever receiving the current position information, during the vehicle travel, the ITSECU 5 determines whether or not the vehicle has passed through the position (the section where the frequent deceleration operation is predicted) where the vehicle is predicted to stop based on the map information, and sets the candidate area based on the position information, in a case where the vehicle has passed the position where the vehicle is predicted to stop. Alternatively, the ITSECU 5 mutually associates and stores the pedal operation information and the current position information in the database 5a, every constant time or every constant travel distance, during the vehicle travel. Then, the ITSECU 5 extracts the deceleration operation from the pedal operation information stored in the database 5a, discriminates the section with frequent deceleration operation in the same section, and sets the discriminated section as the candidate area.

In a case where the candidate area is set, whenever receiving the current position information, during the vehicle travel, the ITSECU 5 determines whether or not the vehicle has entered the candidate area based on the current position information (step S1).

In step S1, in a case where it is determined the vehicle has entered the candidate area, whenever receiving the current position information (or every constant time, or whenever the pedal-on/off is detected), the ITSECU 5 obtains the pedal operation information and the vehicle behavior information (for example, the vehicle speed information) which are supplied from the CAN 4, and stores the pedal operation information and the current position information in the database 5b by associating with the vehicle behavior information as the data of the candidate area which the vehicle currently enters (step S2). Then, the ITSECU 5 determines whether or not the vehicle has exited from the candidate area based on the current position information (step S3). In step S3, in a case where it is determined not that the vehicle has not yet exited from the candidate area, the ITSECU 5 returns to the process of step S2. In addition, in step S3, in a case where it is determined that the vehicle has exited from the candidate area, the ITSECU 5 counts up the total number of passages (the number of passages) with respect to the candidate area once (step S4).

When the vehicle has exited from the candidate area, the ITSECU 5 sorts the deceleration operation and the acceleration operation, based on the pedal operation information which is stored at this time in the database 5b with respect to the candidate area (step S5).

Then, based on the sorted deceleration operation, the ITSECU 5 discriminates the related deceleration pattern from the deceleration patterns as a first filter, and determines whether the deceleration operation is the approach deceleration action toward the deceleration object or the deceleration action before or after the approach (step S6). Here, in a case where the deceleration operation is the deceleration action before or after the approach, the deceleration operation is not used as a sample for creating the deceleration prediction information. In this manner, the ITSECU 5 determines whether or not the vehicle is stopped using the deceleration operation of the approach deceleration action, within the candidate area.

If only the approach deceleration action is extracted among the deceleration operations within the candidate area, the ITSECU 5 determines the presence or absence of the creep operation in the approach deceleration action as a second filter (step S6). In case of the approach deceleration action without the creep operation, based on the deceleration operation in the approach deceleration action, the ITSECU 5 specifies the deceleration beginning position from the position information when the accelerator-off operation is performed, specifies the brake beginning position from the position information when the brake is firstly in the on-operation from the accelerator-off operation, and specifies the stop position from the position information when the brake is finally in the off-operation. In case of the approach deceleration action with the creep operation, the ITSECU 5 specifies the deceleration beginning position and the brake beginning position in the same manner as described above, and specifies the stop position from the position information when the brake beginning the creep operation with regard to the stop position is firstly in the off-operation.

Then, in a case where it is determined that there has been the deceleration stop action, the ITSECU 5 updates (counts up once) the number of stops with respect to the candidate area (step S7). Furthermore, the ITSECU 5 updates the stop rate from the number of stops and the total number of passages with regard to the candidate area (step S8).

In a case where the total number of passages with regard to the candidate area is a predetermined number or more and the stop rate is a threshold value or more, the ITSECU 5 specifies the candidate area as the assistance area. In a case where it is specified as the assistance area, the ITSECU 5 updates the assistance area registration information (which is the deceleration prediction information, and which is the deceleration beginning position information, the brake beginning position information, and the stop position information, for each assistance area) with regard to the assistance area (step S9). Then, when the vehicle passes through the assistance area next time, the ITSECU 5 transmits the assistance area registration information to the HVECU 6, in order to perform the eco-assistance.

In step S1, when it is determined that the vehicle has not yet entered the candidate area or if the process up to step S9 has been finished, the ITSECU 5 determines whether or not the learning process has been finished (for example, the vehicle travel has been finished) (step S10). The ITSECU 5 finishes the learning in a case where it is determined that the learning process has been finished in step S10, and returns to the process in step S1 in a case where it is determined that the learning process has not been finished in step S10.

In a case where the assistance area registration information is received, the HVECU 6 performs the information providing, the vehicle control and the like for the purpose of the eco-assistance, based on the usual deceleration beginning position, the brake beginning position, and the stop position of the vehicle (moreover, the vehicle driver) which are in the assistance area.

According to the vehicle information processing system 1, the assistance area (area where the vehicle performs the usual deceleration stop) by learning the deceleration stop action of the driver for each vehicle is specified based on the database 5b which stores the information for each vehicle, thereby the eco-assistance which is appropriate for the driver can be performed for each vehicle. Since the eco-assistance which is appropriate for the driver can be performed for each vehicle, the driver can receive the assistance without feeling irritation or discomfort with respect to the assistance. Particularly, the vehicle information processing system 1 mutually associates and stores the pedal operation information, the current position information, and the vehicle behavior for each candidate area in the database 5b. Thus, it is possible to determine the deceleration stop action for each candidate area from the information for each candidate area stored in the database 5b, and it is possible to specify the candidate area with high stop frequency as the assistance area.

Furthermore, according to the vehicle information processing system 1, in a case where the assistance area is specified, the usual deceleration beginning position, the brake beginning position, and the stop beginning of the vehicle (the driver) are specified based on the information for each candidate area, which is stored in the database 5b, thereby enabling the eco-assistance suitable for the deceleration stop operation sense of the vehicle driver.

In addition, according to the vehicle information processing system 1, the candidate area is set by obtaining the frequent deceleration operation section through the learning the frequent deceleration operation section in the travel route of the vehicle (the driver), and thus the deceleration action learning can be performed with respect to the candidate area depending on the vehicle (the driver). The vehicle information processing system 1 sets the candidate area based on the position information in which the vehicle is predicted to stop in the travel route of the vehicle (the driver) using the map information, and thus it is not necessary to perform the data storage or learning, and the candidate area can be easily set. In addition, the vehicle information processing system 1 stores the deceleration operation information for each vehicle in the database 5a, and sets the candidate area by learning the frequent deceleration operation section of the driver for each vehicle, based on the information stored in the database 5a. Thus, the candidate area depending on the vehicle can be set with high accuracy.

In addition, according to the vehicle information processing system 1, the pedal operation information and the current position information are mutually associated and stored in the database 5b, and the acceleration operation and the deceleration operation are sorted in order of the pedal operation transition based on the pedal operation information stored in the database 5b. Thus, it can be used in the vehicle stop determination or the deceleration stop action extraction for each vehicle. Furthermore, according to the vehicle information processing system 1, the vehicle behavior information is also associated and stored in the database 5b. Thus, the vehicle stop can be more accurately determined, and the deceleration stop action for each vehicle can be learned in more detail.

Although the embodiments according to the present invention are described above, the present invention may be implemented in various forms without being limited to the embodiments described above.

For example, the present embodiment may be configured to include the database installed in the vehicle, and to perform each learning in the vehicle, but may be configured to include the database installed in the center which provides the vehicle with various services to perform each learning in the center. Thereby, a memory capacity or a processing load can be decreased in each vehicle. In a case where the database is included in the center, a wireless communication can be performed between the vehicle and the center, the vehicle can transmit each information stored in the database to the center, and the vehicle can receive the assistance area registration information or the like from the center. In the database of the center, the data for all the assistance target vehicles (drivers) are stored. In addition, the database may be included in the center, and it may be configured to perform each learning in each vehicle. Even in this case, the memory capacity of the vehicle can be decreased.

In addition, in the present embodiment, the information for each vehicle is stored in the database, and is configured to perform the learning for each vehicle. However, the information for each driver may be stored in the database in a case where a unit that recognizes each driver is included, and the learning for each driver may be performed. In this case, the assistance area for each driver can be specified, and the eco-assistance which is appropriate for each driver can be performed.

In addition, the present embodiment is applied to a case where the assistance is performed with regard to the deceleration stop, but can be applied even to a case where the assistance is performed with regard to the start acceleration. Even with regard to the start acceleration, various start acceleration patterns, the operation transition of the deceleration operation or the acceleration operation during the start acceleration may be used, and thereby it is possible to perform the candidate area learning or the start acceleration action learning using the same method. In addition, the present embodiment is applied to the eco-assistance, but can also be applied to another assistance.

In addition, the present embodiment only illustrates an example of a hardware configuration, and the process using the hardware configuration in order to embody the present invention, and the hardware configuration or the process for embodying the present invention may be modified. For example, each learning may be performed by a navigation ECU instead of the ITSECU.

INDUSTRIAL APPLICABILITY

The present invention specifies the assistance area by learning the driver's driving action for each vehicle based on the database which stores the information for each vehicle, and thereby it is possible to perform the assistance which is appropriate for the driver for each vehicle.

REFERENCE SIGNS LIST

1 . . . vehicle information processing system, 2 . . . road-to-vehicle communication device, 3 . . . navigation system, 4 . . . CAN, 5 . . . ITSECU, 5a,5b . . . database, 6 . . . HVECU

The invention claimed is:

1. A vehicle information processing system comprising:
a database that mutually associates and stores deceleration operation information indicating a prior deceleration operation implemented by a driver and corresponding position information of a vehicle; and
control circuitry that calculates a frequency of the deceleration operation in a same section based on the information stored in the database, and specifies a section where the frequency is equal to or more than a threshold value as an assistance area where an assistance regarding the deceleration operation is performed with respect to the driver when the vehicle passes through the assistance area a subsequent time.

2. The vehicle information processing system according to claim 1, wherein the assistance area includes a position where the deceleration operation is performed, and has a predetermined distance in a direction of the vehicle travel.

3. The vehicle information processing system according to claim 2, wherein the database stores an operation performed in order of accelerator-off, brake-on/off at least once, and accelerator-on, as the deceleration operation information.

4. The vehicle information processing system according to claim 1, wherein the assistance area is set based on the position information predicted in advance of where the vehicle is likely to stop.

5. The vehicle information processing system according to claim 1, wherein the control circuitry classifies an operation into an acceleration operation and a deceleration operation from an operation transition order using the driving operation information stored in the database.

6. The vehicle information processing system according to claim 5, wherein the driving operation information when the vehicle stops or the driving operation information when the vehicle starts is extracted based on the classified acceleration operation and deceleration operation, and an assistance is performed with respect to the driver using the extracted driving operation information.

7. The vehicle information processing system according to claim 1, wherein behavior information of the vehicle is associated and stored in addition to the deceleration operation information and the position information in the database.

8. The vehicle information processing system according to claim 1, wherein an assistance with respect to the vehicle driver is an operation assistance during deceleration stop and/or an operation assistance during a start acceleration.

9. The vehicle information processing system according to claim 8, wherein the deceleration operation counted in the frequency of the deceleration operation is same as the deceleration operation during the deceleration stop and/or the deceleration operation during the start acceleration.

10. The vehicle information processing system according to claim 1, wherein the database is included in a center which performs the assistance with respect to the vehicle.

11. The vehicle information processing system according to claim 1, wherein the database is included in the vehicle.

12. A driving assistance system comprising:
a database that mutually associates and stores deceleration operation information indicating a prior deceleration operation implemented by a driver and corresponding position information of a vehicle;
control circuitry that calculates a frequency of the deceleration operation in a same section based on the information stored in the database, and specifies a section wherein the frequency is equal to or more than a threshold value as an assistance area where an assistance regarding the deceleration operation is performed with respect to the driver when the vehicle passes through the assistance area a subsequent time; and
control circuitry that implements the assistance regarding the deceleration operation with respect to the driver based on the assistance area specified by the control circuitry.

* * * * *